July 17, 1923.

R. P. SAFFOLD

TRACTOR

Filed Jan. 7, 1920

1,462,304

Inventor
Ray P. Saffold.

by
his Atty's

Patented July 17, 1923.

1,462,304

UNITED STATES PATENT OFFICE.

RAY P. SAFFOLD, OF BISBEE, ARIZONA.

TRACTOR.

Application filed January 7, 1920. Serial No. 349,849.

*To all whom it may concern:*

Be it known that I, RAY P. SAFFOLD, a citizen of the United States, and residing at Bisbee, in the county of Cochise and State of Arizona, have invented certain new and useful Improvements in Tractors; and I do hereby declare the following to be a full, clear, and exact description of the invention, such as will enable others skilled in the art to which it appertains to make and use the same.

My invention has primary reference to those vehicles whose running wheels are of the car wheel design, that is, having a tread surface and a flange. My primary object is to provide improved means for applying the tractor belt and readily removing it according as the vehicle may be moved over ground having no tracks or one having a track surface.

Figure 1:
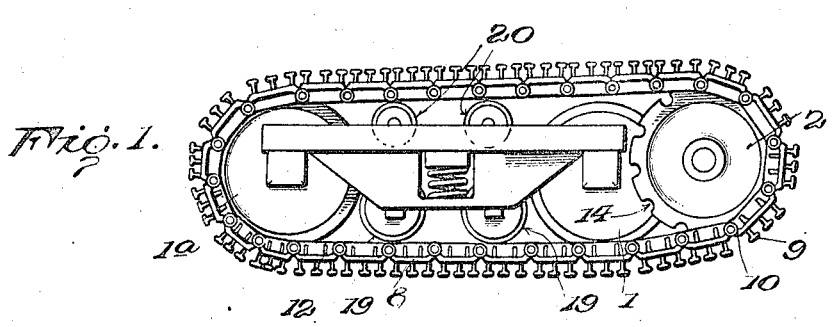
Figure 2:
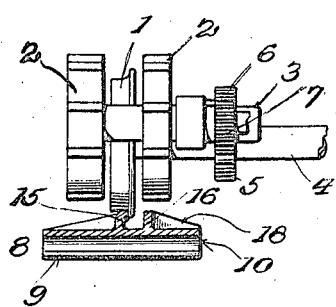
Figure 3:
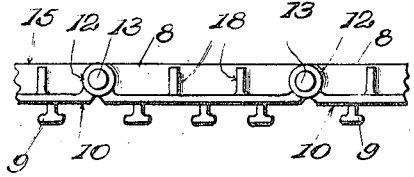
Figure 4:
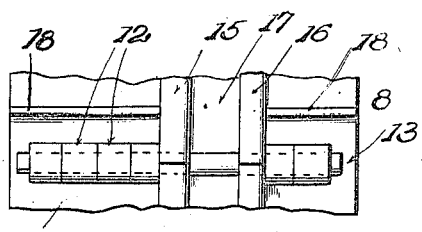
Figure 5:
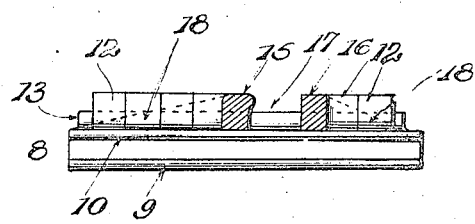
Figure 6:
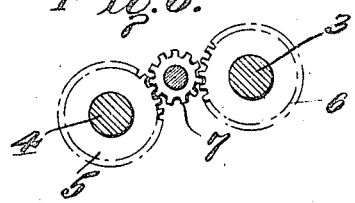

Figure 1 shows a side elevation of a tractor belt and complementary parts. Figure 2 is a section of the tractor belt and an edge view of one of the running wheels and the operating gears. Figures 3, 4 and 5 are details of the belt. Figure 6 is a detail, showing the driving connection between the car axle and the gear wheels. I have illustrated the car truck equipped with ordinary running wheels 1, 1ª, having the usual flanges at their inner edges. Secured to the car truck adjacent the running wheel 1 is a pair of gear wheels 2 mounted on a shaft 3 journaled in the car truck. 4 designates the axle on which the running wheel is mounted. It carries a pinion 5 and the shaft 3 also has a pinion 6. A gear 7 meshes with the two pinions. By this means the gear wheels 2 will rotate with the running wheels and at the same speed.

I make the self laying track of a series of links 8. Each of these is formed with a tread surface 9 above which is a plate 10 suitably secured to the tread surface. At each end of the link the plate is formed with a series of perforated ears 12, the ears on the plates of adjacent links being arranged to alternate so that when they are brought together their perforations will be in alinement to receive a bolt 13. This permits of ready flexing of the track and it also provides appropriate means for engagement with the gear wheels. These are shown formed with transverse peripheral grooves 14 corresponding in formation to the ears 12 and correspondingly spaced apart so that the ears may enter the grooves as the gear wheels are operated.

Also mounted upon the plate 10 of each link is a track 15 of the usual formation to receive the flanged running wheels 1, 1ª. Spaced apart from this way or track 15 is a guard rail 16, the flange of the wheel being received by the intermediate space 17. These rails are maintained in proper position by braces 18. When it is desired to remove the track it is only necessary to remove one of the bolts 13 to disconnect any two of the links 8.

As indicated in Figure 1 the car may be equipped with guide wheels 19 swiveled upon the truck. These are of assistance in the transportation of heavy loads and they tend to maintain the tractor belt in proper relationship. I have also shown the truck equipped with guide rollers 20 over which the belt may pass.

It will be understood that I provide one of the continuous tracks for each side of the car and that owing to the effective manner in which the belt is held to the running wheels by the rails 15, 16, it is not necessary to duplicate the gear wheels 2, that is, it is not necessary to provide them for both the rear as well as the front wheels of a truck as the belt will maintain its proper position in traveling over running wheel 1ª.

My invention is adapted to motor cars as well as to trailers.

I claim as my invention:

1. The combination with a car truck, running wheels, an axle, a small wheel on said axle, of a shaft on said truck, a wheel on said shaft, a smaller wheel on said shaft, a wheel meshing with the small wheels on said axle and shaft, and a continuous laying track adapted to pass over said running wheels and the larger wheel on said shaft.

2. The combination with car supporting wheels journaled in a truck, one of said wheels being a driver, of an endless track having a tread surface and a rail surface on which the wheels are supported for travel, and a positive connection between said driver and track for positively driving the endless track, said driver driving the car on the rail surface.

3. The combination with a car truck, running wheels, an axle and a pinion on said axle, of a shaft on said truck, a gear wheel on said shaft, a pinion on said shaft, a gear meshing with the pinions on said axle and shaft, and a continuous self laying track adapted to pass over said running wheels and gear wheel.

In testimony whereof I have signed this specification.

RAY P. SAFFOLD.